United States Patent [19]

Durrum

[11] 4,177,470
[45] Dec. 4, 1979

[54] DATA RECORDING APPARATUS

[75] Inventor: Emmett L. Durrum, Menlo Park, Calif.

[73] Assignee: Eldex Laboratories, Incorporated, Menlo Park, Calif.

[21] Appl. No.: 860,232

[22] Filed: Dec. 13, 1977

Related U.S. Application Data

[62] Division of Ser. No. 705,471, Jul. 15, 1976, Pat. No. 4,064,512.

[51] Int. Cl.² .................... G01D 15/16; G01D 15/24
[52] U.S. Cl. ................................. 346/139 R; 346/137
[58] Field of Search ........................... 346/137, 139 R

[56] References Cited

U.S. PATENT DOCUMENTS 2,703,745   3/1955   Smith ........................... 346/137 X Primary Examiner—George H. Miller, Jr.
Attorney, Agent, or Firm—Thomas H. Olson

[57] ABSTRACT

Data recording apparatus wherein the data is recorded on a sheet in a spatial arrangement or pattern corresponding to the spatial arrangement of a plurality of containers that constitute a part of a fraction collecting apparatus. The fraction collector operates by moving a nozzle carrying the discharge from a fractionating column along a path on which the containers are disposed. There is a data recording sheet and a pen supported for inscribing a graph on such sheet. The pen moves in unison with the nozzle and is displaced in a direction transverse to the path so that the spatial arrangement of the graph corresponds to the spatial arrangement of the containers.

1 Claim, 4 Drawing Figures

DATA RECORDING APPARATUS

This is a division of application Ser. No. 705,471 filed July 15, 1976, U.S. Pat. No. 4,064,512.

BACKGROUND OF THE INVENTION

1. Field of the Invention

This invention relates to data recording apparatus and more particularly to apparatus that records data in a prescribed spatial arrangement that corresponds to the spatial arrangement of material the characteristics of which the recorded data represents.

2. Description of the Prior Art

There are many known forms of fraction collectors which are useful in determining the presence and quantity of a given substance in a test solution. In utilizing such prior art fraction collectors, the unknown substance is passed through a fractionating column, and the output of the column is collected in a series of individual containers in timed sequence. The sequence in which the constituents or fractions of the material exit the fractionating column is a function of the retention properties of each particular constituent. Although such unknown materials can often be divided into a large plurality of individual fractions, it is typical that but a few of the individual fractions require further attention or analysis. In order to identify the particularly pertinent fractions, it is conventional to record one or more particular characteristics (e.g., optical density, electrical conductivity, ph, radioactivity and the like) of the material exiting the fractionating column and then determining from the recorded data which particular fractions are of greatest pertinence. Prior art techniques for recording such data have taken the form of a strip chart recorder where a graph is drawn as the strip advanced at a prescribed rate. Although the data recorded is accurate, its use is difficult because extra steps are required in coordinating and identifying a particular fraction with a particular point on the graph. The present invention, by way of contrast, records data in a spatial arrangement that corresponds with the spatial arrangement of the collected fractions so that the particular fractions of most interest can be readily identified by visual inspection and comparison between a chart achieved according to the invention and the fractions collected from the column.

One specific prior art fraction collector is disclosed in U.S. Pat. No. 3,871,426 (Class 141/130). In the patented fraction collector a plurality of fraction collecting containers are arranged in a spiral path in a disc. The present invention is particularly suitable in conjunction with the fraction collector disclosed in U.S. Pat. No. 3,871,426 because the time base is linear and independent of the radius of the spiral at any point.

SUMMARY OF THE INVENTION

An object of the invention is to provide data recording apparatus which produces in graphic form data relating to a characteristic of fractions of the effluent from a fractionating column wherein the data are spatially arranged in correspondence with the spatial arrangement of the fractions to afford ready identification of the particular fractions of interest. This object is achieved by providing a sheet carrier, a sheet and an inscribing device such as a pen movable relative the sheet to inscribe data thereon. The pen is moved in unison with the nozzle that distributes the fractionating column effluent to the fraction collector so that the pen traverses a path similar to that traversed by the nozzle. Means are provided for displacing the pen transversely to the path, such deflections occurring in a position on the graph paper that corresponds with the position of the particular fraction.

Another object is to provide a data recorder capable of recording a substantial amount of data with a linear time base in a relatively small area. This object is achieved according to the present invention by providing a circular sheet and a carrier for the same and moving a pen or the like in a spiral path relative to the sheet.

A further object of the invention is to provide a graph that is easily readable and readily correlated with the fractions to which specific parts of the data or curve relate. This object is achieved according to the present invention by providing a sheet of graph paper that is preprinted with circles or like indicia that correspond in size and location to each of the fraction collecting containers. The carrier for the sheet and the sheet are so constructed that the spatial arrangement and location of the indicia and inscribed data on the sheet correspond with that of the array of fraction collecting containers. Accordingly, the data recorded by the graph can be readily correlated with each of the samples collected in the containers.

The foregoing together with other objects, features and advantages will be more apparent after referring to the following specification and the accompanying drawing.

DESCRIPTION OF THE PREFERRED EMBODIMENTS

Figure 1:
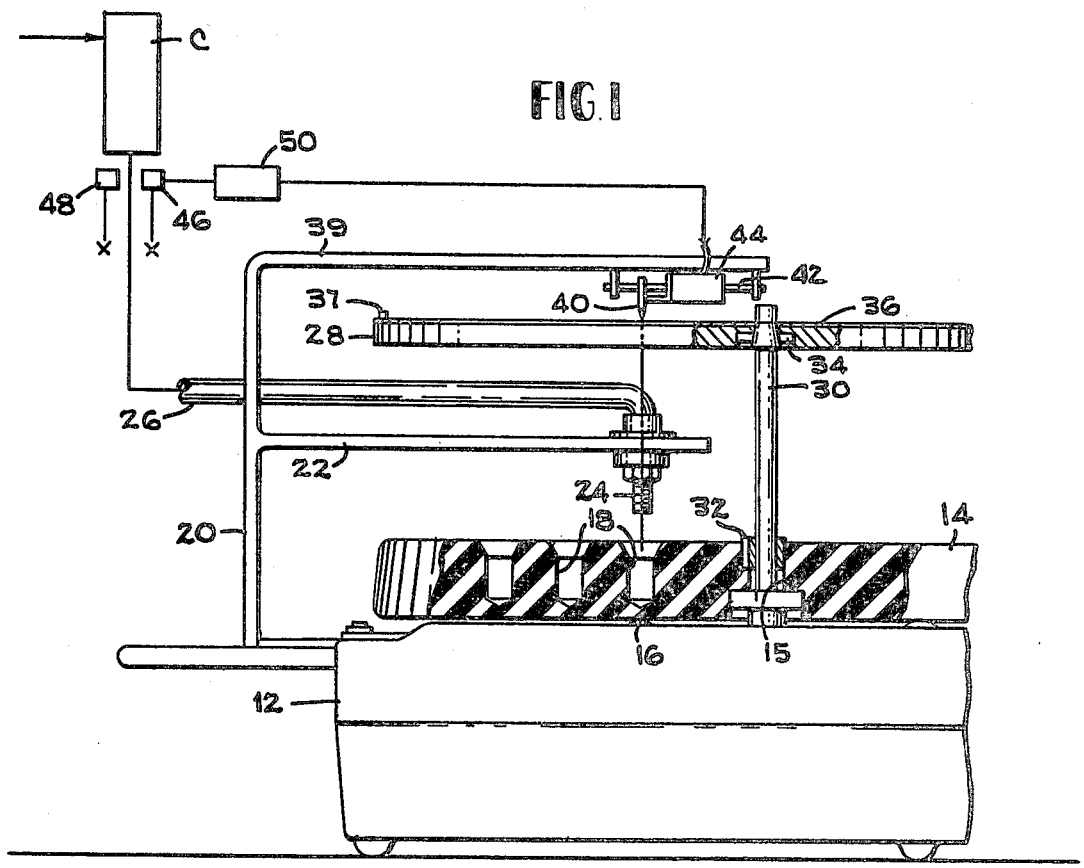
FIG. 1 is a fragmentary side elevation view of a fraction collector of the type disclosed in U.S. Pat. No. 3,871,426 on which the data recording apparatus of the invention is installed.

The disclosure of the above cited U.S. Pat. No. 3,871,426, insofar as necessary to understand more fully the operation of the fraction collector shown fragmentarily in FIG. 1, is incorporated hereinto by this reference. It is sufficient for the present to note that the fraction collector includes a base 12 which supports a circular body 14 at the center of the body for rotation thereon. Supported in base 12 for radial movement relative a central opening 15 of disc 14 is a carriage that includes a motor driven rubber wheel or O-ring 16 which imparts rotary motion to body 14. As disclosed in more detail in U.S. Pat. No. 3,871,426, the carriage on which O-ring 16 is supported moves radially inward as the O-ring rotates body 14 so that the carriage and the O-ring define a spiral path. The speed of the portion of body 14 in contact with O-ring 16 is constant because the speed of rotation of the O-ring is constant so the individual fraction collecting container 18 that is vertically aligned with O-ring 16 travels at a constant speed.

This provides the aforementioned linear time base. Mounted to the carriage on which O-ring 16 is carried is a vertical arm 20 and a horizontal arm 22 which supports a nozzle 24 in alignment over the container aligned with O-ring 16. Nozzle 24 is fed by a tube or hose 26, the opposite end of which is connected to a conventional fractionating column indicated schematically at C. As disclosed in U.S. Pat. No. 3,871,426, nozzle 24 moves radially inward in response to rotation of body 14 so that fractions exiting column C are received in sequence in containers 18, which are arranged in a spiral configuration on body 14.

According to the present invention there is a disc shaped sheet carrier 28 which is supported for rotation above body 14 by means of a stub shaft 30. Stub shaft 30 has at the lower end thereof a key 32 for engagement with a corresponding keyway formed in body 14 and at the upper end a key 34, carrier 28 having a suitable keyway for engaging the latter key so that the carrier rotates in unison with body 14. Carrier 28 has an upper planar surface on which is supported a data sheet 36 formed of paper or like medium that has an inscribable surface. Carrier 36 has an index pin 37 projecting upward from the surface thereof; data sheet 36 has a correspondingly positioned hole 38 through which the index pin extends when the sheet is in place on the carrier in order to achieve proper registry between the sheet and body 14.

Rigid with arm 22 and radially moveable in unison therewith is an auxiliary arm 39 on the inner end of which is supported a pen 40 or like device for inscribing data on the surface of sheet 36. As can be seen in FIG. 1, pen 40 is in vertical alignment with nozzle 24 and O-ring 16 which represents the normal or index position of the pen. The pen can be displaced radially inward or outward of such position, however, because it is suppported for radial movement on a track 42 that is fixed to arm 39, there being a transducer 44 for so displacing the pen by an amount corresponding to the magnitude of the signal supplied to the transducer. The signal supplied to transducer 44 is proportional to a characteristic of the substance exiting column C, e.g., the optical density of the substance. There is an optical detector 46 which receives an amount of light from a light source 48 that is proportional to the optical density of the material because the detector and the light source are disposed on oppposite sides of the out flow of column C. An amplifier 50 is provided for amplifying the signal from optical detector 46 so as to drive transducer 44 and pen 40 in proportion to the optical density or like characteristic of the substance exiting the fractionating column.

Figure 2:
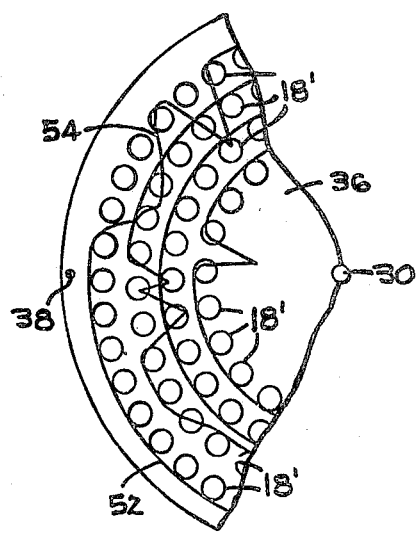
FIG. 2 is a fragmentary view of a data recorder sheet employed with the apparatus of FIG. 1 and exemplifying data collected by the apparatus.

In operation vertical arm 20 and horizontal arms 22 and 39 reside in a radial outward position as explained in the above U.S. Pat. No. 3,871,426. Central opening 15 of body 14 is engaged on a centrally disposed capstan which is an element within base 12. In such position O-ring 16 is in frictional driving contact with the lower surface of body 14. Stub shaft 30 is installed as is carrier 28 and sheet 36. When fractionating column C begins functioning, the motor that drives O-ring 16 is energized so as to initiate rotation of body 14 and carrier 28. As explained in U.S. Pat. No. 3,871,426, nozzle 24 and pen 40 describe a spiral path with respect to body 14 and carrier 28, respectively, and each time a fraction having a measurable characteristic, e.g., an optical density deviating from background optical density, passes tube 26 intermediate light source 48 and optical detector 46, transducer 44 displaces pen 40 transversely to the normal spiral path. Referring to FIG. 2, the normal position of the line inscribed by pen 40 is shown at 52 which line corresponds to the path traversed by nozzle 24 relative body 18. A portion of the inscribed line displaced from such normal position is shown at 54 and indicates that the fractions collected in the containers 18 that spatially correspond with the location of curve 54 contain fractions of more pertinence than fractions in other containers in body 14 that show no corresponding pen excursion. As seen in FIG. 2, sheet 36 can have preprinted thereon a plurality of circles 18' which are spatially arranged in correspondence with the spatial arrangement of containers 18 in body 14. Accordingly, when a sample has been fractionated and collected, the lab technician has available to him a body 14 containing the various fractions in containers 18 and the sheet 36 which identifies by spatial correspondence with the arrangement of the containers, the specific compartments that contain or are likely to contain the fractions of most pertinence. Such fractions can be subjected to further tests. This should be contrasted with prior art techniques in which a straight line or linear strip chart recorder is employed and requires substantial time, effort and equipment to afford indices or like reference marks to correlate the containers in body 14 and the points of interest on such linear graph.

Figure 3:
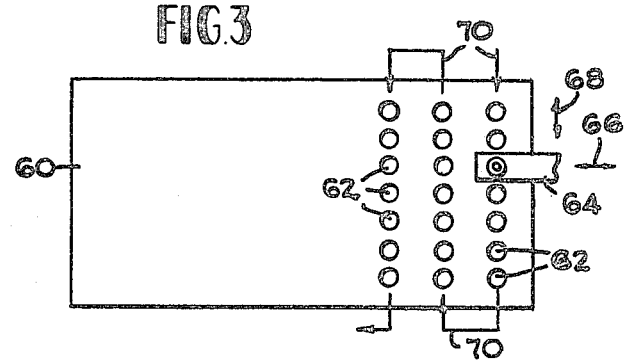
FIG. 3 is a partially schematic plan view of another commercial form of fraction collecting apparatus wherein the nozzle supporting arm traverses the fraction collecting containers along a rectilinear path.
Figure 4:
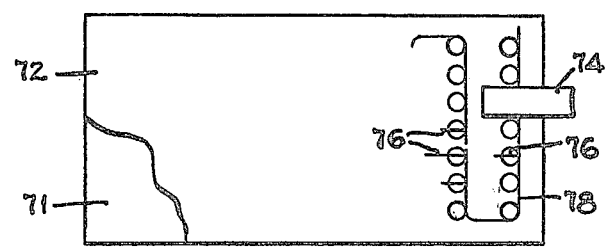
FIG. 4 is a view of a data sheet exemplifying data collected in conjunction with the apparatus shown in FIG. 3.

The present invention finds application in forms of fraction collectors other than that disclosed in above cited U.S. Pat. No. 3,871,426. In FIG. 3 there is schematically indicated one form of conventional fraction collector that has a plate 60 which is adapted to support a plurality of fraction collecting containers 62. In the example shown in FIG. 3, containers 62 are arranged in a plurality of parallel rows and there is a nozzle carrying arm 64 which is driven by appropriate servos or like driving means in orthogonal directions 66 and 68 so that the nozzle is confined to a rectilinear path 70 in order that it traverses the rows of containers 62 in sequence. According to the present invention there is supported adjacent plate 60 and in vertical alignment or other suitable spaced position relative to the plate a carrier 71 that supports a sheet 72 on which a graph is drawn according to the invention. An arm 74 is linked to arm 64 so that arm 74 moves relative sheet 72 in unison with the arm 64. At the outer end of arm 74 is carried an inscribing device such as a pen and a transducer. The transducer for activating the inscribing means on arm 74 can take many forms including that described above in connection with FIG. 1. Such transducer, however, is shown in FIG. 4 to be one which effects inscription of a line 76 which is transverse to path 78 and has a length corresponding to the magnitude of whatever characteristic is measured at the outlet of column C. The transducer is arranged to lift the inscribing means away from sheet 72 on its return to path 78 so as to afford a data display that is easy to read. When fraction collection has been completed by employment of the apparatus of FIGS. 3 and 4, it can be seen that the technician has available to him a series of fluid samples in plate 60 an a graph which spatially corresponds with the location of the fluid samples in the plate so as to facilitate selection of fractions for more thorough analysis.

Because the present invention does not reside per se in any constructional details of the individual elements employed, the above description and drawings are somewhat schematic. For example, the function performed by pen 40 and transducer 44 of making an inscription on the graph can be performed by other well known elements such as galvanometers, servomechanisms, counters, and the like. Moreover, the data can be inscribed in the form of numerals, letters or like symbols representing different values of the characters at the output of column C, so long as the data is inscribed in a spatial arrangement corresponding to that of the containers in which the fractions from the column are collected. Additionally, multiple independently driven pens can be employed in cases in which the value of two or more characteristics of the effluent from column C are to be plotted.

Although the invention is particularly suited in deriving graphs for recording data pertaining to fraction collecting it will be clear that it has other important uses. For example, by employing the graph exemplified in FIG. 2 a substantial amount of data collected on a uniform time base can be recorded on a sheet of extremely small size.

Thus, it will be seen that the present invention provides data recording apparatus that provides for data recordation in a small area and which is capable of recording the data in a spatial arrangement corresponding to the arrangement of some other equipment, for example, a fraction collector. Although two embodiments of the invention have been shown and described it will be obvious that other adaptations and modifications can be made without departing from the true spirit and scope of the invention.

I claim:

1. Improved data recording apparatus for recording data the magnitude of which varies with time comprising a circular carrier having a central axis, means for supporting said carrier for rotation on said axis, inscribing means and carriage means for mounting said inscribing means above said carrier, means for moving said carriage means radially of said central axis in response to rotation of said carrier so as to cause said inscribing means to traverse a spiral path relative said carrier, drive means carried on said carriage means for rotatively driving said carrier, said drive means including a wheel driven at a preselected speed about a generally radially extending axis, said wheel having a periphery in driving contact with said carrier at a point in alignment with said inscribing means so that in response to rotation of said wheel and activation of said moving means said inscribing means travels on a spiral path on said carrier which spiral path has a linear time base, and means for activating said inscribing means to inscribe data indicia adjacent said path that is indicative of the magnitude of variations in the data so as to afford a quantitative indication of said data with reference to the linear time base.

* * * * *